United States Patent
Lacobelle et al.

(10) Patent No.: US 11,559,043 B2
(45) Date of Patent: Jan. 24, 2023

(54) CAT RESCUE TUNNEL APPARATUS AND METHODS OF USE

(71) Applicants: Michelle C. Lacobelle, Cumming, GA (US); Michael James Holihan, Woodstock, GA (US)

(72) Inventors: Michelle C. Lacobelle, Cumming, GA (US); Michael James Holihan, Woodstock, GA (US)

( * ) Notice: Subject to any disclaimer, the term of this patent is extended or adjusted under 35 U.S.C. 154(b) by 0 days.

(21) Appl. No.: 17/816,999

(22) Filed: Aug. 2, 2022

(65) Prior Publication Data
US 2022/0369599 A1 Nov. 24, 2022

(51) Int. Cl.
*A01K 29/00* (2006.01)

(52) U.S. Cl.
CPC ..................... *A01K 29/00* (2013.01)

(58) Field of Classification Search
CPC ..... A01K 29/00; A01K 15/025; A01K 15/006
See application file for complete search history.

(56) References Cited

U.S. PATENT DOCUMENTS

| | | | | |
|---|---|---|---|---|
| 208,470 A * | 10/1878 | Fuchs | ................. | B65G 11/103 182/48 |
| 4,224,754 A * | 9/1980 | Derryberry | ........ | A01M 31/025 135/117 |
| 4,240,520 A * | 12/1980 | LaGrone | .................. | A62B 1/20 182/47 |
| 4,595,074 A * | 6/1986 | Nordtvedt | ................ | A62B 1/20 182/48 |
| 4,825,578 A * | 5/1989 | Robinson | ............ | A01M 31/025 135/90 |
| 5,618,246 A * | 4/1997 | Zheng | ...................... | A63B 9/00 D21/826 |
| D379,209 S * | 5/1997 | Coddington, Jr. | ........... | D21/419 |
| 5,685,076 A * | 11/1997 | Curley | .................... | E04H 15/40 29/897.3 |
| 6,102,762 A * | 8/2000 | Bell | ...................... | B63B 27/143 182/48 |
| 6,688,256 B1 * | 2/2004 | King | ................... | A01K 1/0254 135/124 |
| 6,892,857 B2 * | 5/2005 | Baker | ..................... | A62B 1/20 182/138 |
| 7,559,334 B2 * | 7/2009 | Cooper | .................. | E04H 15/04 135/901 |
| 8,485,209 B2 * | 7/2013 | Imhof | ..................... | E04H 15/54 220/9.3 |

(Continued)

*Primary Examiner* — Ebony E Evans

(57) ABSTRACT

A cat rescue device comprising a plastic mesh tunnel to serve as a passageway, support rings to keep the tunnel open, and weather-resistant material on top. Primarily designed to rescue cats, the device can also be used for cats to escape outdoor predators. The device is flexible, lightweight, and collapsible. It can be attached to a tree or building in an S-shape or spiral configuration, allowing the cat to come down in a gradual descent while moving forward. Multiple cat rescue devices can be adjoined to create any size tunnel. This solves the problem of tree climbers risking their lives, spending many hours in dangerous situations trying to coax the cat into their net, with ice, high winds, or rain further complicating matters. The tree climber will be able to quickly install the device and leave, allowing the cat to come down on its own. This makes the operation easier and less dangerous for both the cat and the rescuer.

3 Claims, 7 Drawing Sheets

(56) References Cited

U.S. PATENT DOCUMENTS

| | | | | |
|---|---|---|---|---|
| 8,973,593 | B1* | 3/2015 | Rudy | A01G 13/0243 |
| | | | | 135/96 |
| 9,314,090 | B1* | 4/2016 | Manning | E04H 15/04 |
| D779,134 | S  * | 2/2017 | Summerford | D29/124 |
| 10,329,091 | B2* | 6/2019 | Hogan | B65G 11/106 |
| 10,704,281 | B1* | 7/2020 | Stahlhut | E04H 15/003 |
| 11,213,764 | B1* | 1/2022 | Li | A63H 33/008 |
| 2003/0022761 | A1* | 1/2003 | Brereton | A63B 9/00 |
| | | | | 482/35 |
| 2005/0034748 | A1* | 2/2005 | Gadd | E04H 1/1244 |
| | | | | 135/126 |
| 2008/0234108 | A1* | 9/2008 | Males | A63K 1/02 |
| | | | | 482/16 |
| 2012/0060881 | A1* | 3/2012 | Ly-Cho | E04H 15/405 |
| | | | | 135/121 |
| 2015/0184378 | A1* | 7/2015 | Silva | E04H 15/44 |
| | | | | 160/351 |

* cited by examiner

CAT RESCUE TUNNEL APPARATUS AND METHODS OF USE

BACKGROUND

Rescuing a cat from a tree has been nothing less than a big challenge over the ages. Current methods employ the use of tree climbers, arborists, and homeowners using everything from stepladders, sectional ladders, ropes, and harnesses for scaling up the trunk and then across branches. Rescuers will carry various bags, animal traps, food, poles, and netting in an attempt to capture the cat and bag it. Local firefighters may not answer the call to rescue a cat, as their primary mission is to focus their attention and resources on human emergencies. Additionally, firefighters hesitate on rescuing cats in trees, due to the potential of getting the fire truck's long ladder mechanism stuck in tree branches. Oftentimes, the fire trucks will not be able to position themselves in urban and rural properties, including hilly areas, and embankments.

Arborists and tree climbers use a system of ropes and pulley mechanisms including work boots with cleats for engaging into the tree bark. This method is often very dangerous to both the cats and the rescuers, as cats tend to climb higher when approached, going up as much as one hundred feet, and oftentimes far out onto unreachable limbs and branches. The rescue mission doesn't always work out well, many times resulting in injury to the cat and cat rescuer. It is especially dangerous for the cat rescuer in inclement weather of thunder, lighting, ice, and rain to try and capture the cat, as it could take several attempts over several hours.

Cat rescuers commonly use a rescue tool known as a "Tomahawk 5 Ft Deluxe Animal Control Pole", model number DACPS (or longer pole variation) for capturing the cat. Another method of capture includes incorporating the use of traps, such as the "Havahart Trap".

Lawrence Jempolsky addresses the issue of capture in U.S. Pat. No. 5,791,292 "Enclosure for capturing and transporting small animals", wherein, this method employs the use of a sliding floor, wherein the enclosure is first placed over the cat and the sliding floor moved to the closed position. This method is designed for ground-based rescues and proves totally unsuitable for tree captures.

Many cat play tunnels and toys are on the market, including Patent CN214385493U to Guangzhou Fushang Textile Products Co Ltd. This patent describes a multi-layered tunnel apparatus, allowing a pet to shuttle back and forth in the tunnel, with a windmill shape as one of the claims. Although this pet play toy is configured as a tunnel, it is unsuitable for use as an outdoor cat rescue apparatus.

Cats are proven prolific climbers and will rarely fall out of a tree, however; over time if the cat remains stuck in the tree for many days, dehydration and malnourishment will set in. The cat's front paws are designed for climbing forward and the hind legs for jumping and landing, where backing down a tree is a challenging task and difficult for them to manage. Hence, there is a continuing need for a robust apparatus and method of cat rescue with a limited use of ladders and/or climbing gear, wherein, the cat will crawl through the apparatus to ground level on its own, when ready.

SUMMARY

It is therefore an object of the present invention to provide a utility device and method for cat rescue. The device is used when a cat needs to be rescued from a tree, however, it also serves as a device and method for cat "self-rescue". The cat rescue tunnel includes a plastic mesh tunnel of medium stiffness, with built-in support rings to keep it open, and a diameter of approximately 7 to 10.5 inches for allowing the cat to walk through. A strip of weather-resistant material covers the top exterior of the plastic mesh tunnel in a lengthwise direction, creating a barrier from the elements, and providing a secure feeling for the cat in any type of weather. There are several embodiments for the device, one including an interior coiled spring that replaces the support rings. The preferred length for the cat rescue tunnel is 20 to 36 feet for manageability.

The cat rescue tunnel can be secured to a tree, building exterior, or interior wall in a variety of flexible arrangements. Various means are used to attach the device, including the use of staples and zip ties. Multiple cat rescue tunnels can be adjoined by zip ties to allow for any size mission.

Cat rescue is a dangerous task, but the cat rescue tunnel significantly reduces the risk. Tree climbers and homeowners use everything from stepladders, sectional ladders, ropes, and harnesses for scaling up the trunk and then across branches to rescue cats. Rescuers will carry various bags, animal traps, food, poles, and netting in an attempt to capture the cat and bag it. It is especially dangerous for the cat rescuer in inclement weather of thunder, lighting, ice, and rain to try and capture the cat as it could take several attempts over several hours. Additionally, local firefighters may not answer the call to rescue a cat, as their primary mission is to focus their attention and resources on human emergencies. They also hesitate on rescuing cats in trees, due to the potential of getting the fire truck's long ladder mechanism stuck in tree branches. Oftentimes, the fire trucks will not be able to position themselves in urban and rural properties, including hilly areas, and embankments. The cat rescue device resolves this problem because it allows the tree climber to simply install the device and leave, allowing the cat to come down on its own and making the operation safer and substantially easier.

The flexibility of the plastic mesh tunnel allows it to be placed in various positions against the tree, such as an S-shape or spiral configuration, wherein, the cat can come down a tall tree section with no branches, making a gradual descent. Additionally, the cat can come down moving forward, rather than backing down, because they are better adapted to forward motion. Given the cat has claws, the mesh can also provide a means to securely hook their claws into the mesh, ensuring steady footing as they descend the tree. This scenario works when using the device on a building or indoors as well.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
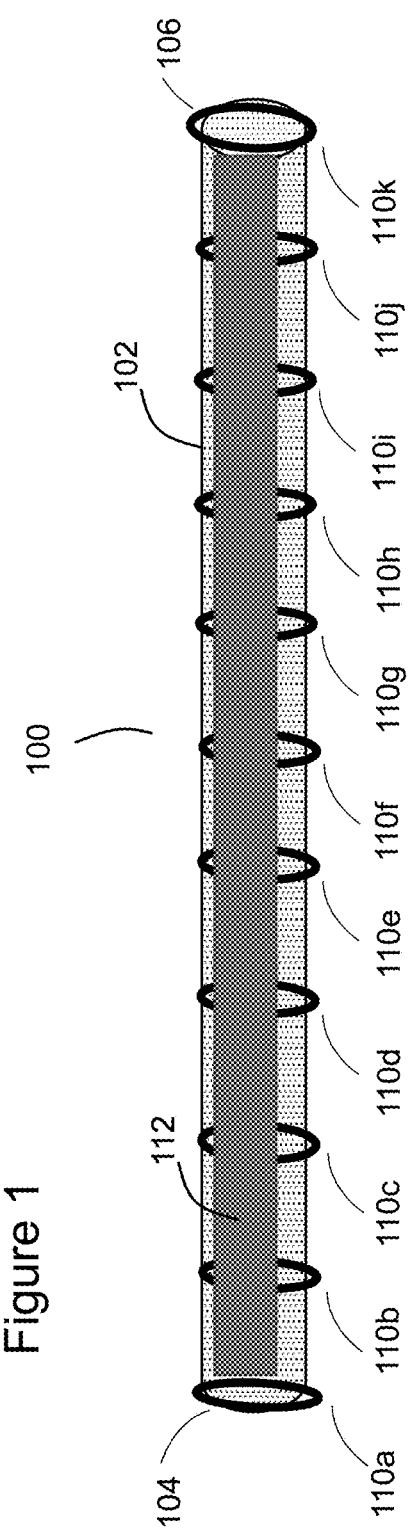
FIG. 1 is a side perspective view of a 20-foot cat rescue tunnel according to the first embodiment of the disclosure.

Reference will now be made to the drawings wherein like numerals refer to like parts throughout. FIG. 1 illustrates the preferred embodiment of a cat rescue tunnel 100. As illustrated on this embodiment, the cat rescue tunnel 100 is comprised of a plastic mesh tunnel 102, eleven support rings 110a-k, a first end opening 104, a second end opening 106, and a barrier cover strip 112. The plastic mesh tunnel 102 provides the passageway for the cat to descend the tree. The plastic mesh tunnel 102 is preferably 20 to 36-feet in length, long enough in length to be useful in various rescue scenarios, such as from trees and buildings, while also being manageable for the installer to work with, as more than one cat device may need to be adjoined for the rescue operation. The diameter of the plastic mesh tunnel 102 preferably ranges between 7.0 and 10.5 inches throughout the entire length of the plastic mesh tunnel 102, best illustrated by the first end view 104 in FIG. 2. Referring back to FIG. 1, the plastic mesh tunnel 102 is commonly constructed from flexible and rugged plastic, with a tensile strength allowing it not to stretch significantly with the weight of a 12-pound cat, and with the mesh openings minimally (0.25 by 0.25) inch, allowing for ample cat ventilation. Throughout the length of the plastic mesh tunnel 102 are support rings 110a-k, placed approximately every two feet apart to keep the plastic mesh tunnel 102 open and also used for anchoring the cat rescue tunnel 100 onto a tree, building or wall, as the support rings would provide more support for anchoring than just the plastic mesh. Some embodiments of the cat rescue tunnel could have support rings made of plastic, but other embodiments could have support rings made of wire, wire-reinforced support rings, or any combination thereof, as long as there is enough strength and rigidity in the support rings to keep the plastic mesh tunnel 102 open for the cat to walk through. In the FIG. 1 example, a 20-foot long cat rescue tunnel 100 is depicted with eleven support rings 110a-k spaced 2-feet apart across its length, however, some embodiments of the cat rescue tunnel 100 could have fewer support rings, while other embodiments many have more support rings. The number of support rings used could be dependent on the gauge of the support ring material and the plastic mesh material chosen. The support rings 110a-k are securely fastened in-place in the mesh tunnel 102 using stitching or possibly a heat-attachment process. The plastic mesh tunnel 102 is collapsible and lightweight, while providing adequate support for a cat weighing approximately 12 pounds to walk through without it collapsing. It will be appreciated that a 6-inch wide, polyester, rain repellant, barrier strip 112 is attached to the surface of plastic mesh tunnel 102, used for general protection against inclement weather. In addition, the cat feels more secure with a darkened overhead covering extending from first end 104, lengthwise to second end 106. Barrier strip 112 affords the cat enough visibility to see out, while still affording the cat a feeling of a closed space. The barrier strip 112 is generally constructed from a thin, dark colored, lightweight, nylon or polyester, water repellant material.

Figure 2:
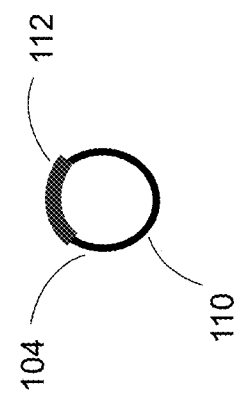
FIG. 2 is an end perspective view of the cat rescue tunnel of FIG. 1.

FIG. 2 illustrates a view of the plastic mesh tunnel 102 looking into the first end 104 opening, depicting the end view of support ring 110 and barrier strip 112. Note the thickness of the barrier strip 112 illustrated in FIG. 2 is not intended to be accurate in scale, but rather to illustrate its location and that it doesn't block any side visibility. Referring to FIG. 1, the barrier strip 112 is preferably attached to the external surface of plastic mesh tunnel 102 using glue and heat or stitched to the mesh grid. The barrier strip 112 width is not critical, however, preferably a minimum of about 25% of the plastic mesh tunnel's 102 circumference should be used to provide ample darkness and protection within the tunnel. Some embodiments of the cat rescue tunnel may not have more than one barrier strip, whereby an additional strip on the bottom could serve to obfuscate the elevation from the cat's view. Other embodiments of the cat rescue tunnel may have different shapes for the barrier strip. While other embodiments of the cat rescue tunnel may have no barrier strip.

Figure 3:
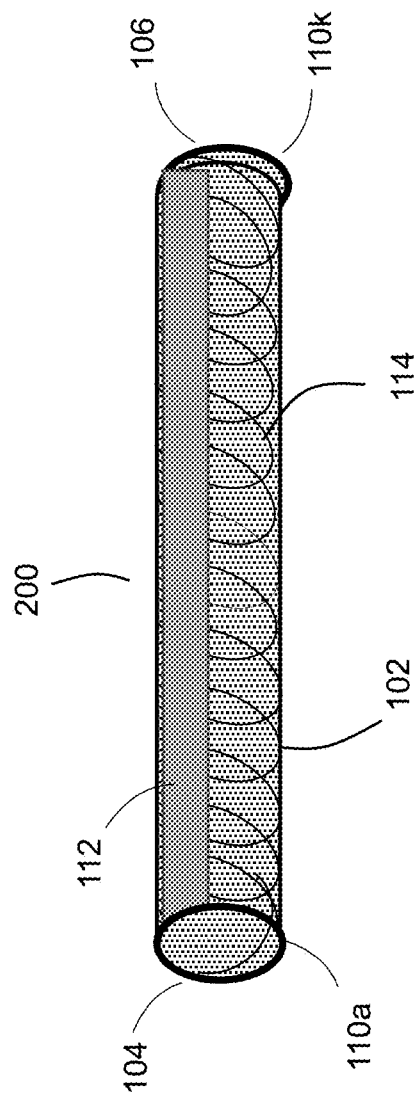
FIG. 3 is a side perspective view of the cat rescue tunnel according to second embodiment of the disclosure.

Turning to FIG. 3, illustrates a cat rescue tunnel 200 embodiment of the device. In cat rescue tunnel embodiment 200, all non-end support rings 110b-j in cat rescue tunnel embodiment 100 are eliminated and replaced by one continuous inner coil spring 114, extending from first end 104, to second end 106. The inner coil spring 114 is attached to support rings 110a, 110k, which remain attached to first end 104 and second end 106 of plastic mesh tunnel 102, providing termination points for the coil spring 114. Support and compressibility are equally comparable to the cat rescue tunnel 100 embodiment attributes from FIG. 1. The wide strip extending from first end 104, to second end 106, represents a side view of the barrier strip 112, and, in particular, illustrates that the barrier strip 112 is applied along the entire length of the tunnel, at the top, without blocking any side visibility.

Figure 4:
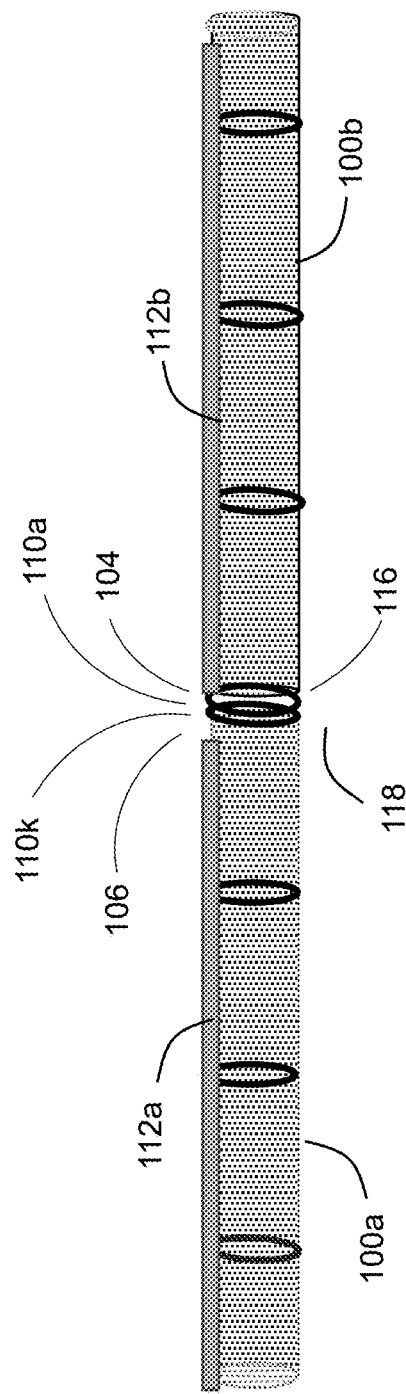
FIG. 4 is a side perspective view of two adjoined cat rescue tunnels of FIG. 1.
Figure 7:
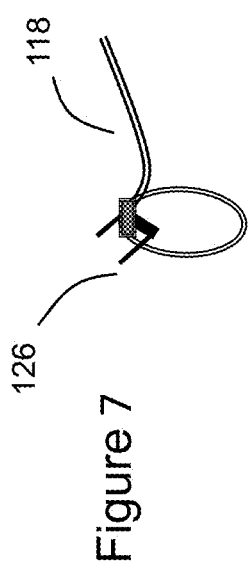
FIG. 7 is a close-up view of the staple and zip tie engagement, used for attaching the cat rescue tunnel.

FIG. 4 illustrates the method of adjoining two separate cat rescue tunnels 100a and 100b, wherein at location 116 they are adjoined from the second end 106 of the first cat rescue tunnel 100a to the first end 104 of the second cat rescue tunnel 100b, using multiple zip ties 118. Refer to FIG. 7 for an enlarged view of zip tie 118. Returning back to FIG. 4, attachment is made by adjoining support ring 110k to a second support ring 110a by threading and looping a zip tie 118 through the mesh around both and zip-locking them together. Preferably, zip ties are fastened around the adjoined location 116 at a minimum of every 90 degrees. Adjoined cat rescue tunnels 100a, 100b should have placement of the barrier strips 112a, 112b in alignment, wherein, the protective barrier appears to be seamless after attachment. Some embodiments of attachment will use zip ties. Other embodiments of attachment may use twist ties, string, or other attachment mechanism.

Figure 5:
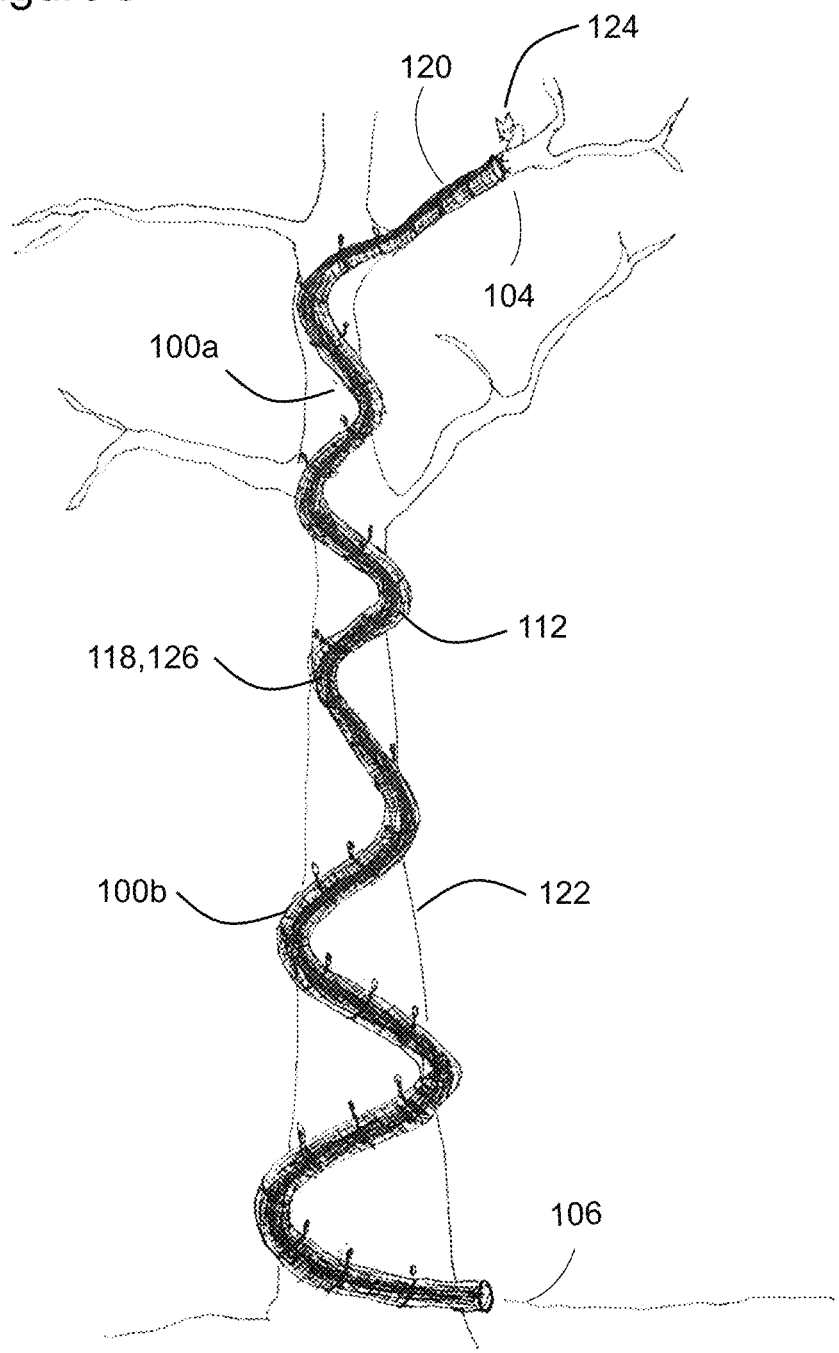
FIG. 5 illustrates a method of attaching two cat rescue tunnels of FIG. 1 to one side of a tree in an S-configuration.

FIG. 5 illustrates the placement of the cat rescue tunnel 100a attached to a branch 120 and proceeding down the tree trunk 122 in an S-shape along one side of the tree trunk 122, the adjoined cat rescue tunnels 100a, 100b providing a gradual sweep back and forth downward for the cat 124 to enter cat rescue tunnel 100a at the first end 104 entrance and, exit the cat rescue tunnel 100b on the ground at the second end 106. It has been noted that cat rescue tunnels 100a and 100b may be 20-36-feet in length and used in any combination thereof. Zip tie 118 and staple 126 attachment elements are illustrated in a plurality of locations along the branch 120 and trunk 122 sections of the tree. An expanded view of the zip tie and staple fastener is illustrated in FIG. 7. Returning to FIG. 5, note the darkened, nylon or polyester, weather resistant barrier strip 112 that extends along the two entire cat rescue tunnels 100a and 100b for the cat's protection and sense of security. The S-shape configuration is not limiting and can be used with other methods of placement, specified or not, herein.

Figure 6:
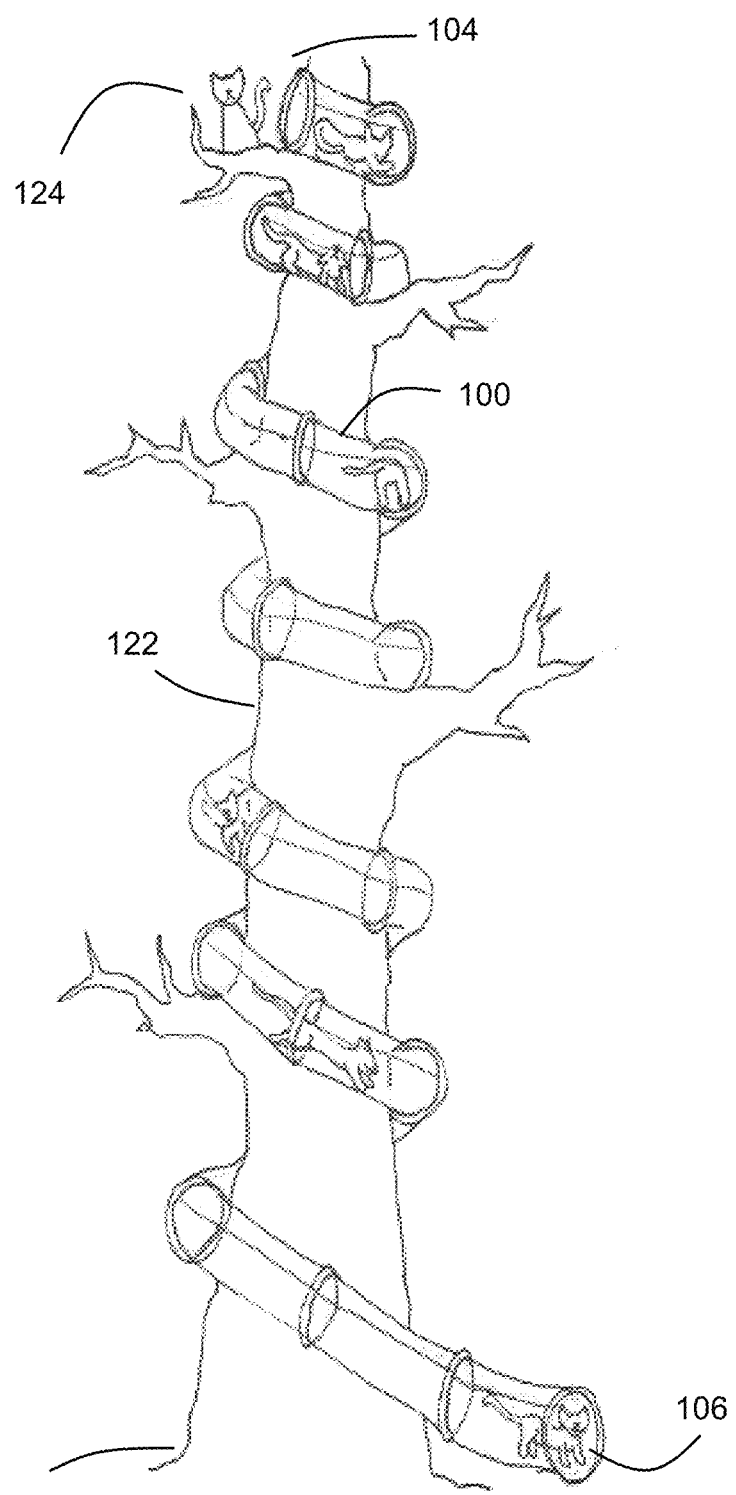
FIG. 6 illustrates a method of attaching the cat rescue tunnel of FIG. 1 to a tree in a spiral configuration.

Turning to FIG. 6, illustrates the method of rescuing a cat from a tree using a cat rescue tunnel 100 by attaching it to a tall tree trunk 122 in an elongated spiral configuration. In this configuration, the goal is to achieve a continuous spiral loop around and downward on the tall tree trunk 122. The cat 124 enters the cat rescue tunnel 100 at first end 104 high up the tree and exits at ground level at second end 106. The spiral configuration is not limiting and can be used with other methods of attachment, specified or not specified herein.

Turning to FIG. 7, illustrates the fasteners and one attachment method used for anchoring a cat rescue device to a tree, building, or wall. A staple 126 is fastened through the loop of a locked zip tie 118, wherein, the staple 126 is used to attach the zip tie loop to the tree with a hammer. The staple is preferably a type MN ½ inch cable staple and sturdy enough to be pounded into the tree without bending. The use of a staple gun with ⅜" or larger staples may also be used.

Figure 8:
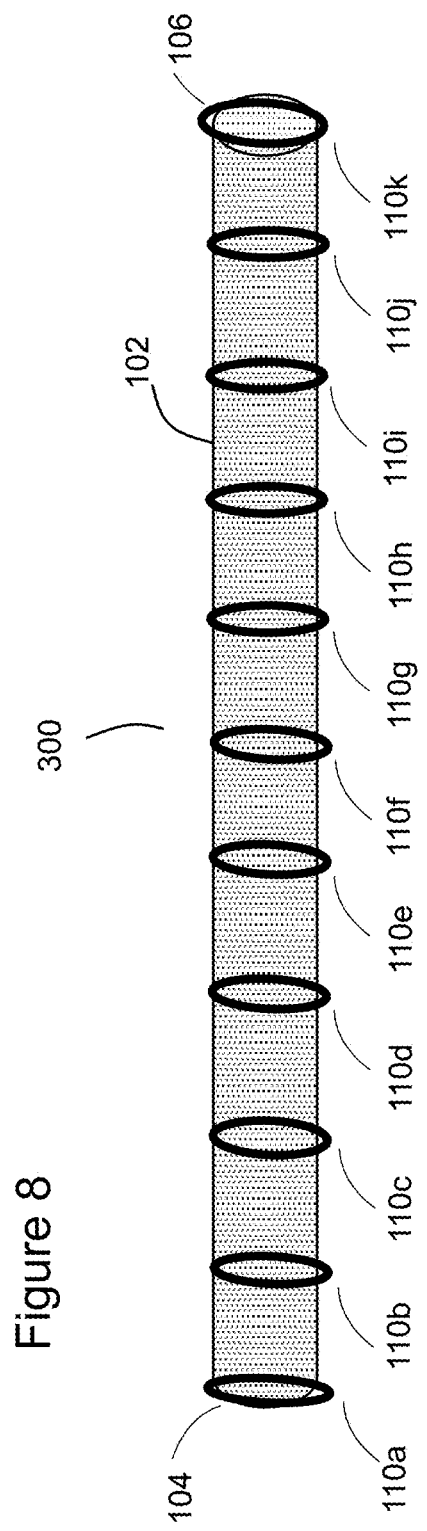
FIG. 8 is a side perspective view of the cat rescue tunnel according to third embodiment of the disclosure.

Turning to FIG. 8, illustrates a cat rescue tunnel 300 embodiment of the device. In cat rescue tunnel embodiment 300, all features of the cat rescue tunnel 100 embodiment remain the same, including support rings 110a-k located from first end 104, lengthwise to second end 106 of plastic mesh tunnel 102. However, the barrier strip 112 is removed in this embodiment 300 to provide even greater visibility.

Figure 9:
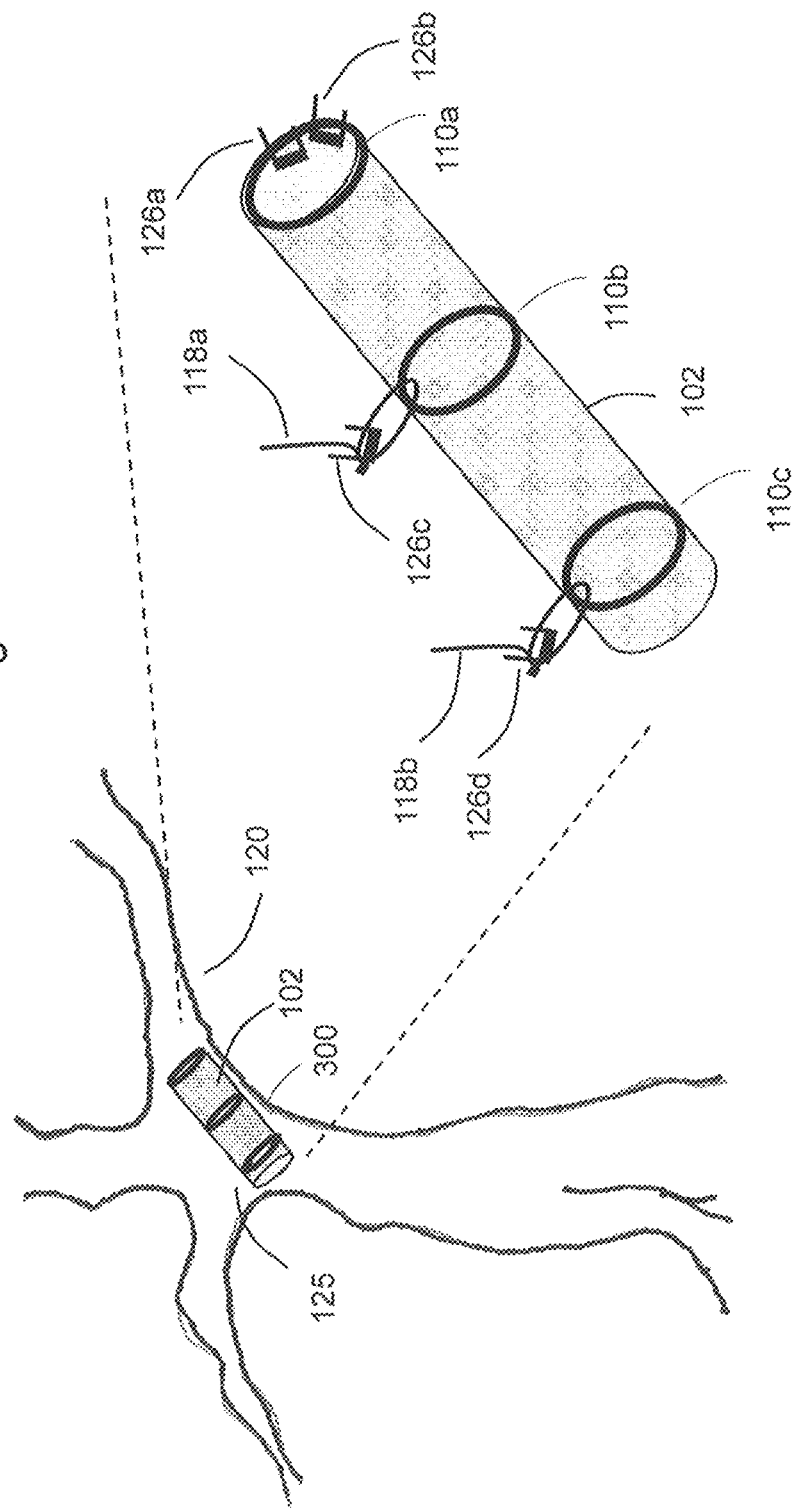
FIG. 9 is a zoom-in view of fastening the first few support rings of a cat rescue tunnel of the third embodiment of the disclosure to a tree.

Turning to FIG. 9, illustrates a zoomed view of the method for anchoring a cat rescue device to a tree. A section of the cat rescue device 300 embodiment, which is without a barrier strip, as shown in FIG. 8, is used for this illustration. Returning to FIG. 9, shows the first end 104 of the device anchored to the tree branch with staples by hammering the staples 126a-b directly across the support ring 110a and into the tree branch 120. As many staples as needed should be used to make the entrance secure to assure the cat that the device is stable. Subsequent support rings 110b-c use the staple 126 and zip tie 118 fasteners and method shown in FIG. 7. Returning to FIG. 9, support rings 110b-c are attached to the tree trunk 125 utilizing staples 126c-d and zip ties 118a-b. Each zip tie 118a-b is laced through the plastic mesh tunnel 102 from the exterior, then threaded around the ring support 126c-d, and back out of the plastic mesh tunnel 102, where it is then zip locked into a loop and attached to the tree with a staple, as described for FIG. 7 in this disclosure. Returning to FIG. 9, while it is shown that consecutive support rings 110a-c are attached to the tree, it would likely not be necessary to anchor the cat rescue tunnel at all support rings. In fact, in some installations the cat rescue tunnel may be self-supported by friction from the tree or branches along the descent.

Figure 10:
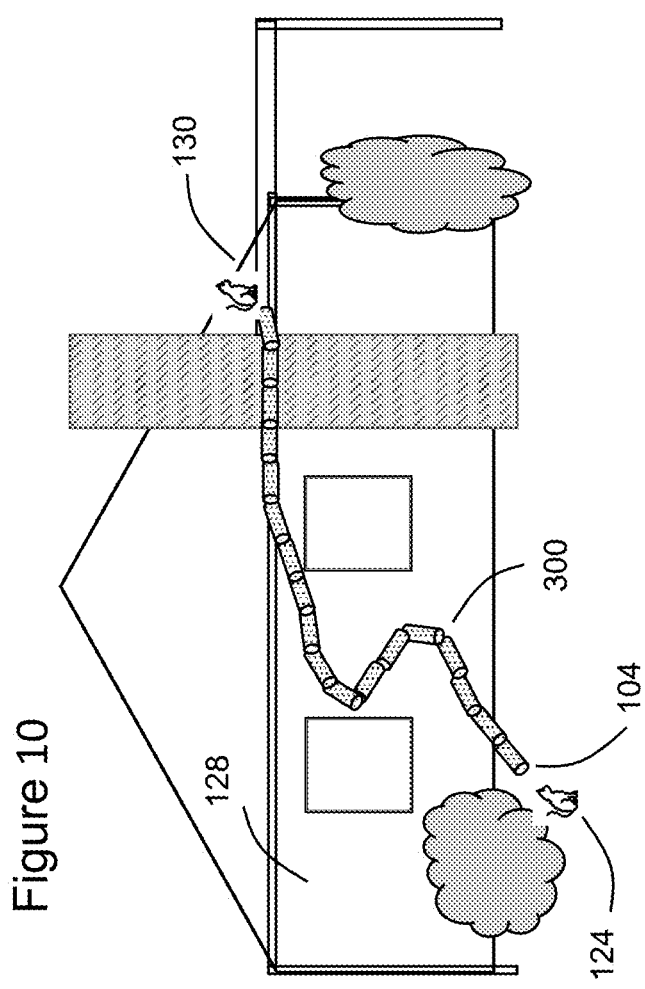
FIG. 10 illustrates the use of the cat rescue tunnel of the third embodiment used in a second example environment.

Turning to FIG. 10, illustrates the cat "self-rescue" embodiment 300, in a different environment, wherein it is attached to the exterior wall of a building, such as a home. In this environment, a cat could use it to escape predators, such as coyotes, foxes, dogs, or other cats. The exterior home wall 128 provides the backdrop for the cat self-rescue tunnel embodiment 300 to be attached. The cat 124 enters the first end 104 of the device, starting at ground level, then climbs to the roof 130 to escape any advancing predator in the surrounding outdoor environment. In this embodiment, alternative fastener hardware more appropriate for attaching the device to the home may be preferable.

Figure 11:
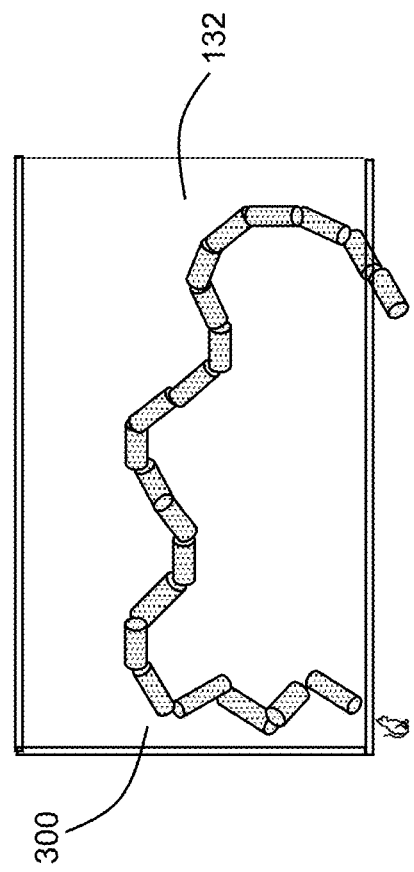
FIG. 11 illustrates the use of the cat rescue tunnel of the third embodiment for indoor training on the device.

Turning to FIG. 11, illustrates the cat rescue tunnel embodiment 300, attached to an interior wall 132 of a house, showing how it could be set up in an indoor environment for training a cat in its use, before it is needed in the outdoor environment. As previously noted, cats enjoy crawling into small spaces, hiding, and climbing. The cat rescue tunnel, being lightweight and collapsible, has the advantage of being set up inside the home to allow the cat to become familiar with it, starting on the floor. This ensures its success for any use.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. A method of rescuing a cat from a tree using zip tie loops and staples by attaching a tunnel apparatus to the tree with the zip ties and staples; wherein said tunnel is tubular in shape and includes: a plastic mesh component defining its passageway, a first and second open end defining its entrance and exit, support ring components that circumference said first and second open ends, a plurality of support ring components securely placed equidistant apart or else a continuous coil component throughout the entire length of the mesh to support it remaining open; the method comprising the steps of:
   a. positioning said tunnel's said first open end at the highest point of the tree where it is needed, with its open end positioned optimally for cat entry, and the remaining part of the tunnel positioned downward on the tree; and
   b. attaching said tunnel's first open end directly to the tree by positioning one or more staples across the said first open end support ring and over the said plastic mesh, then hammering them into the tree; and
   c. attaching zip ties around said tunnel's coil at several, optimal, locations along the tunnel's passageway, by inserting a zip tie from the exterior of the tunnel into the plastic mesh, then around the coil or support rings, then back out to the tunnel's exterior, whereby each zip tie is ziplocked into a loop; and
   d. attaching each zip tie loop to the tree by positioning a staple across the width of an area of the loop and hammering it into the tree, whereby said tunnel may be hung from the tree by the anchored, zip tie loops.

2. The method of claim 1, further comprising a means for attaching and hanging said tunnel in an S-shaped configuration, whereby, positioning said tunnel, down one side of the tree, thereby hanging it from said support rings or coil component in a manner which allows the cat to gradually transcend downward, as it traverses the downward S-shape.

3. The method of claim 1, further comprising a means for attaching and hanging said tunnel in a spiral-shaped configuration, whereby, positioning said tunnel going down and spiraling around said tree, thereby hanging it from said support rings or coil component in a manner which allows the cat to gradually transcend downward in a spiral.

* * * * *